United States Patent Office 3,306,798
Patented Feb. 28, 1967

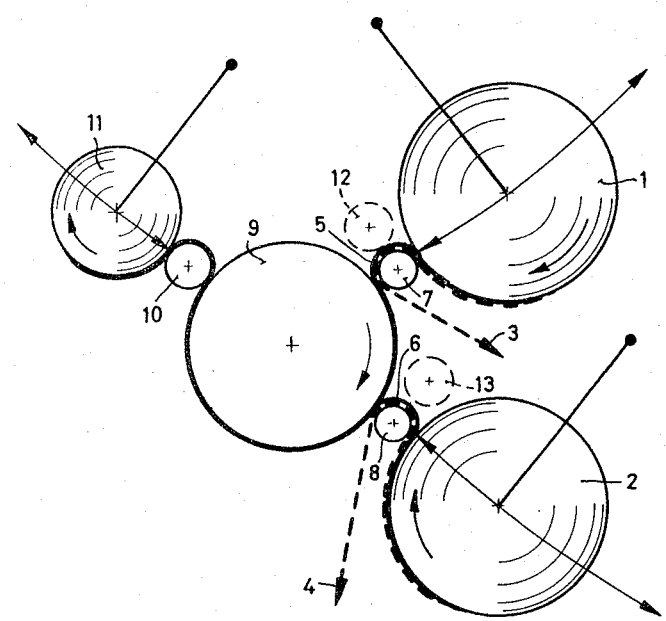

3,306,798
METHOD AND DEVICE FOR PRODUCING
ELECTRICAL THIN-FOIL CAPACITORS
Fritz Gaenge, Munich, Germany, assignor to Siemens & Halske Aktiengesellschaft Berlin and Munich, a German corporation
Filed Oct. 30, 1962, Ser. No. 234,103
Claims priority, application Germany, Nov. 7, 1961, S 76,583
11 Claims. (Cl. 156—192)

The invention disclosed herein is concerned with a method of and a device for producing electrical thin-foil capacitors made of a plurality of thin-foil bands which are formed by placing upon auxiliary carrier foils varnish layers and vaporizing coatings thereon, whereupon the thin-foil bands are removed from the auxiliary carrier.

In the production of thin-foil capacitors, a first varnish layer is placed upon a suitable carrier foil, for example, upon a paper foil impregnated with high melting hydrocarbon substance or upon a band of suitable synthetic material, and upon this first varnish layer is vaporized a metal coating on which may be provided further varnish layers and metal coatings. However, it was found that there is a limit to the number of metal coatings and varnish layers that can thus be provided in superposed relationship, primarily for the reason that the entire band is necessarily rendered unusable by faults occurring in the production of one of the layers or coatings. It is therefore in some cases necessary to wind not only two but four or more thin foil bands to produce a thin-foil capacitor. In case the individual bands should laterally shift, one with respect to the others, during the winding thereof, there will result difficulties, for example, in the contacting of the coatings of such a capacitor by spraying contact layers at the ends of the metal coatings, in that parts of the metal coatings are not properly contacted. The corresponding capacitor will have a relatively high loss factor.

In order to avoid these drawbacks, it is in accordance with the invention proposed to bond together at least each two of the thin foil bands prior to winding them to form a capacitor wrap. The bonding together of the respective two thin foil bands can be effected in various ways, for example, by cementing with the aid of solvents, cementing agents or varnish. However, it was found that it is particularly advantageous to apply heat so as to soften the surface of the thin foil bands which are to be joined and to press the softened surfaces together. This may be accomplished in simple manner by moving the thin foil bands which are to be joined over a heated bonding drum. The auxiliary carrier foils which are connected with the respective thin foils can be separated therefrom during or prior to the bonding operation. Both auxiliary carrier foils may be removed, especially when the total thickness of the joined thin foil bands is sufficient for the self-supporting processing thereof. If this is not the case, only one of the auxiliary carrier foils may be removed and the other may be retained to serve as a carrier for the new foil formed of the two thin foils.

The thin foils are advantageously preheated before they are moved over the bonding drum, which is, for example, effected by moving them over a further drum the temperature of which is maintained somewhat below the bonding temperature. Such preheating may be utilized for facilitating the separation of the auxiliary carrier foil, particularly when using auxiliary carrier foils which are impregnated with high melting hydrocarbon substances. The temperature of the preheating drum is maintained in the neighborhood of the melting point of the impregnating substance. In order to further facilitate the bonding, it has been found advisable to place the metal coatings of the thin foils which are to be joined in suitable known manner on an electrical voltage of opposite polarity so that the thin foils are pressed together by the action of electrostatic forces.

The method according to the present invention offers particular advantages in the production of electrical thin-foil capacitors comprising four thin foils, each such foil having two varnish layers and one metal coating, the first varnish layer which is provided upon the auxiliary carrier being formed of acetylcellulose and the metal coating being formed of aluminum, while the second varnish layer is formed of polystyrol, and wherein the four thin foils are in the capacitor arranged and contacted so that the first acetylcellulose varnish layers lie in the field-free space while the second polystyrol varnish layers are electrically effective. In order to obtain such arrangement, two thin foil bands are respectively bonded together with the acetylcellulose layers in engagement, and the respective plural-layer bands each comprising two bands which are bonded together and which if desired may also be bonded together, are wound or wrapped to form a capacitor.

The present invention can also be advantageously employed in connection with thin-foil capacitors made of two thin foils each of which is formed of a first relatively thin varnish layer and a metal coating and a second, thicker varnish layer. The bonding together of two such bands makes it possible to produce a thin-foil capacitor wound of only one single band, requiring no particular precautions to prevent damage of the thin band during the winding thereof. The removal of the auxiliary support or carrier can be effected, instead of directly incident to the winding and with use of a special device, prior to, during or after the bonding.

Further details will appear from the description which is rendered below with reference to the accompanying drawing, showing in schematic representation a device or arrangement for practicing the invention.

Referring now to the drawing, numeral 1 indicates a supply reel carrying a thin foil 5 connected with a support or carrier foil 3 and numeral 2 indicates a similar supply reel carrying a thin foil 6 connected with a support or carrier foil 4. The thin foils connected with the corresponding support or carrier foil, coming from the supply reels 1 and 2, are moved over respective heated intermediate rollers indicated at 7 and 8, at which the carrier foils 3 and 4 are separated and removed from the thin foils 5 and 6. Upon using as carriers paper bands impregnated with high melting hydrocarbon substance, the rollers 7 and 8 are kept at a temperature of about 100° C. The separated carrier foils can be wound on suitable reels, not shown, for re-use thereof. The thin foils 5 and 6 are moved over a bonding drum 9 which is for the bonding of such foils heated to a temperature of about 130° C. to 140° C. Desired and suitable means may be used for heating the respective parts. The foils which are bonded together in this manner are moved over a further intermediate roller 10 which is if desired in suitable manner cooled, and moved from such roller 10 to a winding roller 11 which is driven over a suitable slip clutch. The inside of the thin foil 5 is in the illustrated arrangement connected with the outside of the thin foil 6. The sequence, carrier foil-thin foil, upon the respective supply reels 1 and 2 can be reversed with the use of auxiliary guide rollers 12 and 13, so as to effect if desired bonding of the foils with the inside or with the outside thereof in engagement. Removal of a carrier band 3 or 4, or of both carrier bands, is in such case effected at the respective rollers 12 and 13.

The invention is also adapted for bonding together more than two thin foils, for example, bonding together two foils each comprising two previously bonded foils.

Changes may be made within the scope and spirit of the appended claims which define what is believed to be new and desired to have protected by Letters Patent.

I claim:
1. In the art of making wrapped electrical thin-foil capacitors employing a plurality of thin foil bands which are produced by placing upon auxiliary carrier foils varnish layers on which are vaporized metal coatings and from which coatings the carrier foils are removed prior to the wrapping operation, the method of preparing said thin foil bands for wrapping comprising the steps of supporting at least two thin foil bands while in unwrapped strip form with a face of the respective varnish layer of one band in contacting relation with a face of another such band, and applying heat to at least one of said bands while in such unwound contacting relation to effect a bonding between the contacting faces of said bands prior to the winding thereof to form a capacitor.

2. A method according to claim 1, comprising moving the thin foil bands in common over a heated bonding drum to effect the bonding together thereof.

3. A method according to claim 1, comprising removing the auxiliary carrier foil from at least one of said thin foil bands prior to the bonding thereof to another thin foil band.

4. A method according to claim 1, comprising preheating the thin foil bands to a temperature below the bonding temperature thereof but sufficient to soften the varnish and release the carrier foil and thereupon moving said bands over a bonding drum heated to a bonding temperature so as to effect the bonding together of said thin foil bands.

5. A method according to claim 1, wherein said auxiliary carriers comprise impregnated paper bands, and further comprising the steps of moving the respective thin foil bands with their corresponding carriers over a heated drum at which said foils are preheated to the melting temperature of the impregnating medium, and removing the auxiliary carrier foil from the respective thin foils at said heated drum.

6. A method according to claim 1, comprising placing the metal coatings of the thin foils which are to be bonded together on an electrical voltage so as to produce during the bonding together thereof electrostatic forces which are operative to press said foils together.

7. A method according to claim 1, wherein the respective thin foil bands comprise a layer of acetylcellulose on one outside surface and a central metal coating and a layer of polystyrol on the other outside surface, comprising bonding together the acetylcellulose layers of said thin foil bands.

8. A method according to claim 1, wherein the respective thin foil bands comprise a first relatively thin varnish layer on one outside surface and a central metal coating and a second varnish layer on the other outside surface which is made of the same material as the first varnish layer and thicker than said first varnish layer.

9. A method according to claim 7, comprising preheating the respective thin foil bands to a temperature of about 100° C. and removing the carrier foils therefrom, and thereafter heating said band to a temperature from 130° C. to 140° C. to effect the bonding thereof.

10. Apparatus for use in making wrapped electrical capacitors employing a plurality of thin foil bands which are produced by placing upon auxiliary carrier foils varnish layers on which are vaporized metal coatings, and wherein at least two thin foil bands are bonded together prior to the wrapping thereof to form a capacitor, said apparatus comprising, a plurality of supply reels disposed for pivotal motion and carrying respectively a carrier foil and a thin foil band provided thereon, a heated bonding drum, a like plurality of intermediate rollers heated to a temperature only high enough to soften the varnish and release the carrier foils which are peripherally in engagement with said supply rollers and with said bonding drum and over which intermediate rollers the respective foils are moved and at which the respective carrier foils are separated and removed from the corresponding thin foil bands, said thin foil bands thereupon moving over said bonding drum at which they are bonded together, a pivotally mounted winding roller driven by a slip clutch for receiving the bonded thin foils, and an intermediate roller disposed between said winding roller and said bonding drum for guiding the bonded thin foil bands from the bonding drum to the winding roller.

11. Apparatus according to claim 10, comprising further intermediate rollers cooperatively arranged with respect to the first named heated intermediate rollers for guiding the respective thin foil bands to said bonding drum.

References Cited by the Examiner

UNITED STATES PATENTS

| | | | |
|---|---|---|---|
| 2,017,367 | 10/1935 | Kurz. | |
| 2,224,370 | 12/1940 | Wescott | 156—322 |
| 2,305,658 | 12/1942 | Andersen et al. | 156—322 X |
| 2,382,432 | 8/1945 | McManns et al. | |
| 2,703,772 | 3/1955 | Keithly | 156—239 X |
| 2,892,972 | 6/1959 | Ross | 156—233 |
| 2,955,773 | 10/1960 | Burke. | |
| 2,991,550 | 7/1961 | Block | 156—89 X |
| 3,024,155 | 3/1962 | Huber | 156—247 |

FOREIGN PATENTS

| | | |
|---|---|---|
| 722,409 | 1/1955 | Great Britain. |
| 803,173 | 10/1958 | Great Britain. |
| 818,103 | 8/1959 | Great Britain. |

OTHER REFERENCES

Ser. No. 391,220, Pfeiffer (A.P.C.), published May 11, 1943.

EARL M. BERGERT, *Primary Examiner.*

C. B. COSBY, *Assistant Examiner.*